US006125119A

United States Patent [19]
Cherukuri et al.

[11] Patent Number: 6,125,119
[45] Date of Patent: Sep. 26, 2000

[54] DYNAMIC PERMANENT VIRTUAL CONNECTION (DPVC) AT USER-TO-NETWORK INTERFACES IN FRAME RELAY NETWORKS

[75] Inventors: Janakirama Rao Cherukuri, Chapel Hill; David Anthony Sinicrope, Cary, both of N.C.

[73] Assignee: International Business Machines Corporation, Armonk, N.Y.

[21] Appl. No.: 08/950,715

[22] Filed: Oct. 15, 1997

[51] Int. Cl.[7] .................................................. H04Q 11/04
[52] U.S. Cl. ........................................ 370/410; 370/409
[58] Field of Search .................................. 370/410, 409, 370/400, 389, 397, 399, 522, 404, 403

[56] References Cited

U.S. PATENT DOCUMENTS

| | | | |
|---|---|---|---|
| 5,051,982 | 9/1991 | Brown et al. | 370/58.2 |
| 5,265,091 | 11/1993 | van Landegem | 370/60 |
| 5,392,402 | 2/1995 | Robrock | 395/200 |
| 5,416,771 | 5/1995 | Iwata | 370/60 |
| 5,490,141 | 2/1996 | Lai et al. | 370/79 |
| 5,521,914 | 5/1996 | Mavraganis et al. | 370/60 |
| 5,548,589 | 8/1996 | Jeon et al. | 370/60.1 |
| 5,608,447 | 3/1997 | Farry et al. | 348/7 |
| 5,631,903 | 5/1997 | Dianda et al. | 370/401 |
| 5,654,966 | 8/1997 | Lester, Jr. et al. | 370/392 |

FOREIGN PATENT DOCUMENTS

| | | |
|---|---|---|
| 9534151 | 12/1995 | WIPO . |
| 0627965 | 9/1996 | WIPO . |

OTHER PUBLICATIONS

IBM TDB, vol. 39, No. 9, Sep. 1996, pp. 225–226 "Combining Multi–Link Transmission . . . ".

*Primary Examiner*—Salvatore Cangialosi
*Attorney, Agent, or Firm*—Gerald R. Woods

[57] ABSTRACT

A frame relay network relies on virtual connections to support the exchange of data through an intervening network from an originating end system to a remote destination end system. While permanent virtual connections or PVCs (connections which remain established even when data is not being sent) might be used to form the virtual connection, switched virtual connections (SVCs) are preferred within the network since such connections are cleared when not needed. Clearing a connection makes the resources previously allocated to the connection available for use by other end users. However, end user systems typically expect to see PVC service through the network, leading to difficulties in establishing SVCs end-to-end. To support continued use of PVC applications preserving availability of network resources, a Dynamic Permanent Virtual Connection or DPVC is defined. The DPVC provides an end user a capability to notify the frame relay network whether the resources of the SPVC may be released.

5 Claims, 6 Drawing Sheets

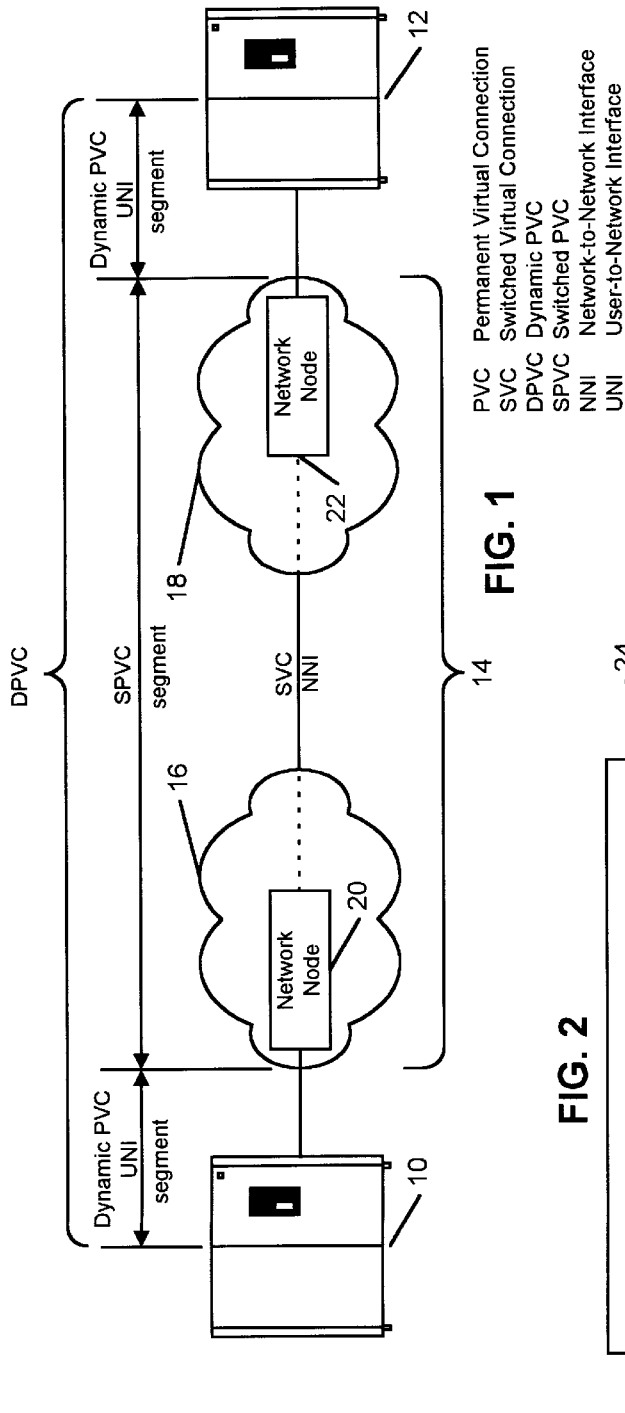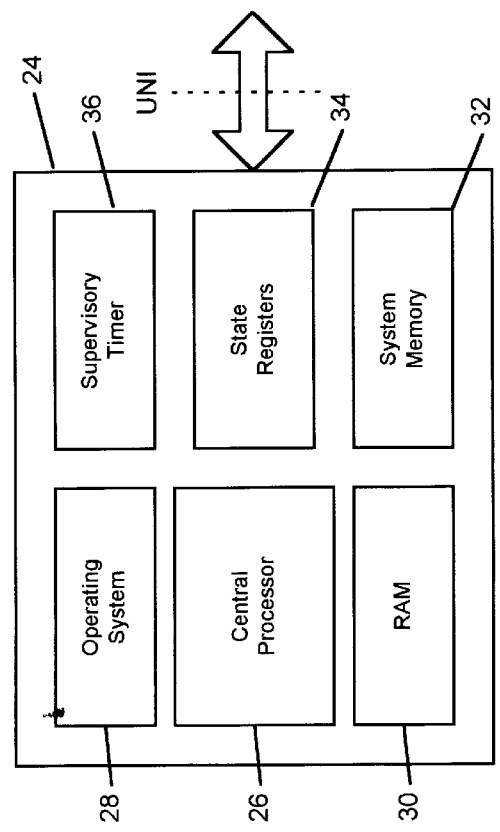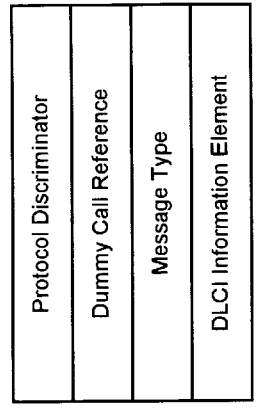

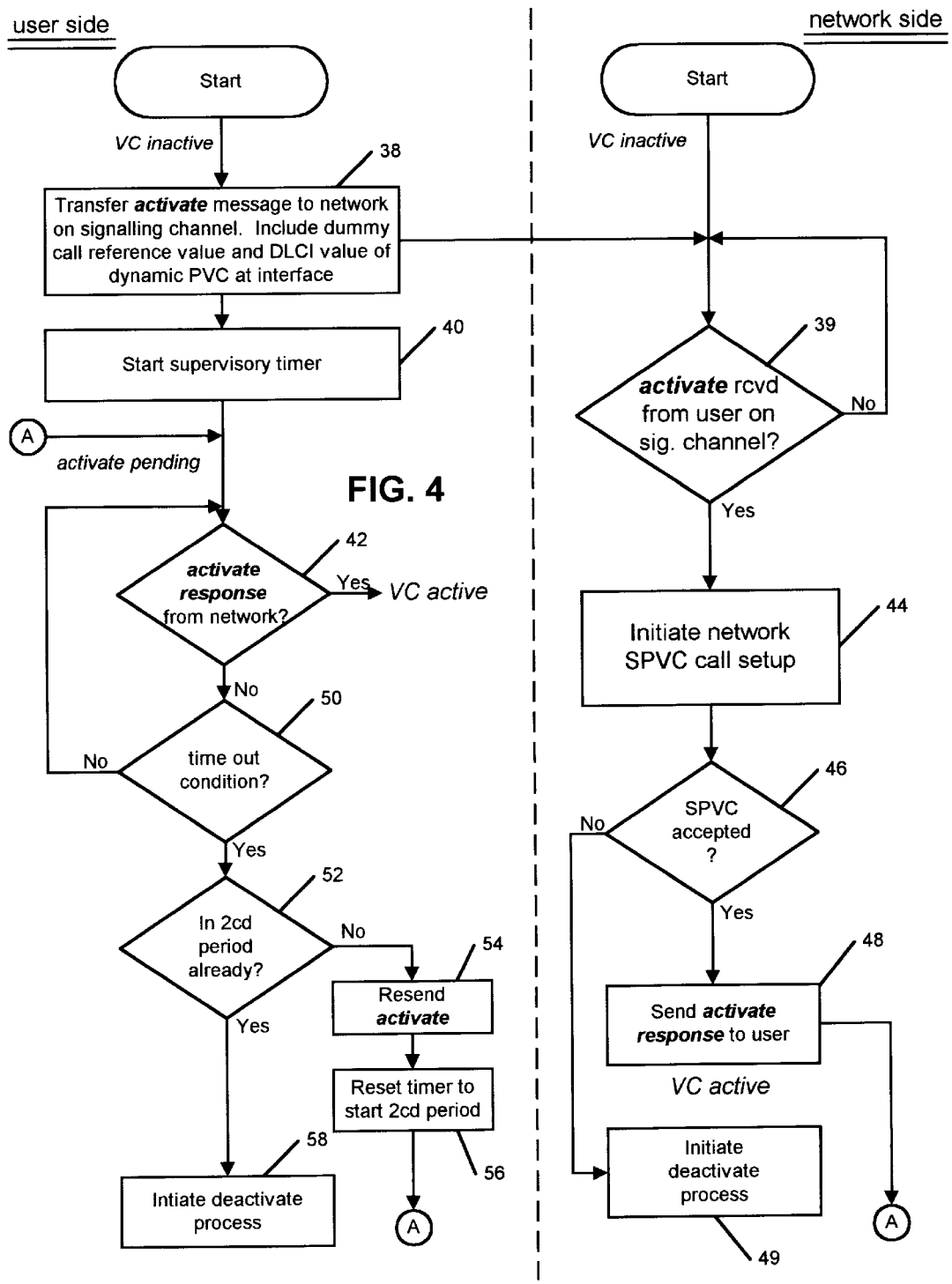

DYNAMIC PERMANENT VIRTUAL CONNECTION (DPVC) AT USER-TO-NETWORK INTERFACES IN FRAME RELAY NETWORKS

FIELD OF THE INVENTION

The present invention relates to data communication networks and more particularly to a method of dynamically establishing/clearing a permanent virtual connection at both user-to-network interfaces within a frame relay network. This is termed a dynamic permanent virtual connection or DPVC.

BACKGROUND OF THE INVENTION

Data networks used to transport data between distant end users can employ any of a number of technologies in transferring the data across intervening, interconnected systems. One well-known technology is frame relay technology which can be used to transport variable length data messages between the end users. In a frame relay network, a virtual link or virtual connection (VC) exists across the entire network between the communicating end users. This virtual connection provides the bi-directional transfer of data messages from an originating end user to a destination end user with the order preserved. This is done on the basis of a label attached to each data message called a data link connection identifier (DLCI). Each end associates the virtual connection with its own DLCI. The DLCI may be the same or different from the DLCI used at the other end.

Each DLCI is associated with a user-to-network interface (UNI). A UNI is a interface between a frame relay network and an end user. It includes a physical interface on the end user device, a physical interface on the frame relay network equipment, and the physical line between them.

Network nodes within the frame relay network communicate across network-to-network Interfaces or NNIs. The details of UNIs and NNIs are not important to an understanding of the present invention but may, if desired, be found in a number of documents available from known standards organizations. Representative documents include Frame Relay Forum FRF 1.1, Frame Relay Forum FRF 2.1, ITU X.76, ITU X.36, ITU Q.933 Annex A, and Frame Relay Forum FRF.10.

In known networks, data routing devices are typically interconnected using frame relay permanent virtual connections or PVCs. The descriptor "permanent" means that the resources for the connection remain committed for the life of the connection between the end users and are thus unavailable for use by others even when those resources are not actually needed. PVCs are an inefficient use of network resources and increase network operating costs for both network service providers and end users.

To provide more effective utilization of network resources, switched virtual connections (SVCs) can be implemented within and between frame relay networks. In the case of switched connections, network resources are committed for the duration of the connection. When there is no data to be transferred, the user can clear the virtual connection, releasing the network resources and making them available to other connections. Details of SVCs can be found in ITU X.36, X.76, Q.933; Frame Relay Forum FRF.4 and FRF.10. While SVCs are highly flexible, they are also costly to implement at a UNI and provide more functionality than is required by many existing network devices.

It is possible to provide a PVC service to the end users using SVC processing within and between frame relay networks. The resulting VC is called a switched permanent virtual connection (SPVC). The SPVC appears to the end users as a PVC, but is connected through the frame relay network(s) as an SVC. Although the SVC provides high resiliency and a reduction in network provisioning requirements, the service to the end user is still that of a PVC which means that network resources are committed to the VC even when there is no data to send. The end user has no means of notifying the frame relay network whether the resources of the SPVC are needed or not.

SUMMARY OF THE INVENTION

To provide the flexibility of connections that can be dynamically established and cleared for a specific end user without the attendant costs and complexities of switched virtual connections, a dynamic permanent virtual connection or DPVC has been developed. DPVCs support user-controlled establishment and clearing of frame relay SPVCs without having to implement a full data link layer and sophisticated signaling state machine. DPVCs offer a service similar to that of a standard PVC in that no parameter or addressing signaling is done.

The invention is implemented in a method for use in a data communication network having at least two end users connected to a frame relay network. The FR network consists of one or more sub-networks. Sub-networks are connected to each other at network-to-network interfaces (NNIs). Each end user is connected to at least one network node through a user-to-network interface or UNI. A dynamic permanent virtual connection is comprised of a DPVC segment at the originating UNI, an SPVC segment between the originating network node and the destination network node, and a DPVC segment at the destination UNI.

The DPVC segments and the connection parameters (DLCI, committed information rate (CIR), committed burst size (Bc), excess burst size (Be), etc.) are provisioned, similar to an SPVC. The end users can control the establishment and clearing of the SPVC segment via the DPVC signaling mechanisms at the UNI.

In setting up a DPVC between the end users, the originating end user requests the network to activate the DPVC. The network establishes an SPVC to the destination network node and activates the destination and origination DPVC segments, and acknowledges the request. The PVC status management procedures (i.e. Q.933 Annex A) informs the end users that the DPVC is active and can transfer data.

When the end users have completed data transfer the end users initiate deactivation of the DPVC which clears the SPVC segment and releases the network resources.

BRIEF DESCRIPTION OF THE DRAWINGS

While this specification concludes with claims that particularly point and distinctly claim that which is regarded as the present invention, details of a preferred embodiment of the invention may be more readily ascertained from the following detailed description when read in conjunction with the accompanying drawings wherein:

FIG. 1 is a schematic illustration of a virtual connection between two end systems showing the points at which dynamic permanent virtual connection segments established in accordance with the present invention would be used;

FIG. 2 is a block diagram representation of major functional components required in a system which is to implement dynamic permanent virtual connections;

FIG. 3 is a schematic representation of the preferred structure of messages employed in establishing and clearing dynamic permanent virtual connections;

FIG. 4 is a flow diagram of steps performed at an originating end system when establishing a dynamic permanent virtual connection;

DETAILED DESCRIPTION OF PREFERRED EMBODIMENT

Figure 5:
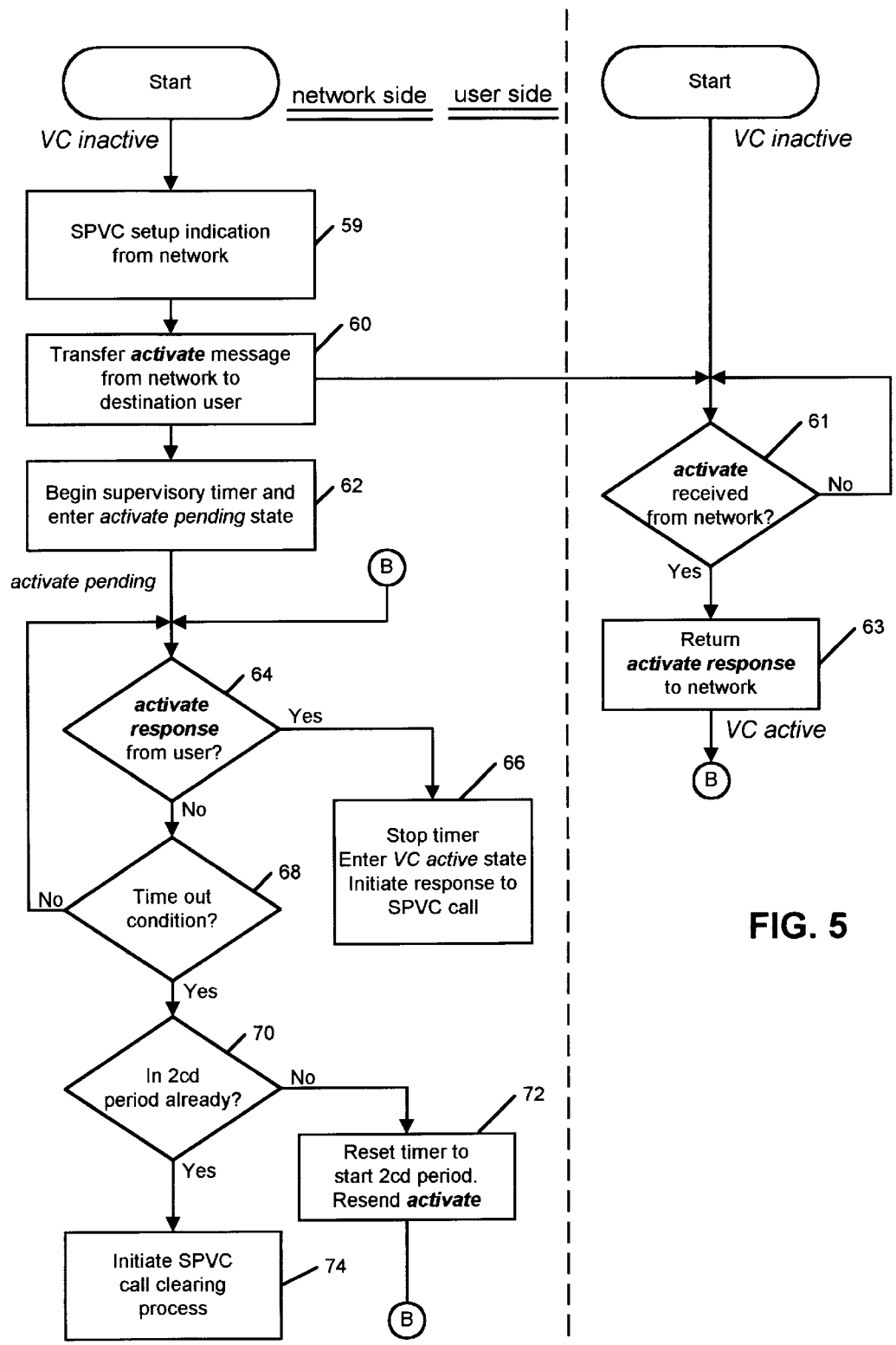
FIG. 5 is a flow diagram of steps performed at a destination user-to-network interface when establishing a dynamic permanent virtual connection.

FIG. 1 is a schematic illustration showing a pair of end systems 10 and 12 which are connected through an intervening frame relay network 14. The frame relay network 14 is shown as including two network "clouds" 16 and 18 having network nodes 20 and 22, respectively. Each "cloud" is typically a complex collection of multiple mesh-connected network nodes and attached end nodes (or end systems) which can operate autonomously from other network "clouds". While only two "clouds" are shown for the sake of simplicity, a typical frame relay network could include any number of such clouds.

The interface between an end system and a network node serving that end system is defined as a user-to-network interface or UNI. The details of a UNI for frame relay networks are available in the references cited earlier but will not be discussed here as they are unnecessary to an understanding of the present invention. Within the frame relay network 14, network nodes are connected through a network-to-network interface or NNI. As with the UNI, details of the NNI need not be discussed here.

Data is exchanged between the end systems 10 and 12 over a dynamic permanent virtual connection. A DPVC consists of connection segments between the end systems and the network nodes serving those end systems and connection segments within the network 14. As noted earlier, within the network 14, the connection segments takes the form of a switched permanent virtual connection (SPVCs) which can be established when a need to send data actually exists or cleared when no such need exists. At the UNI between an end system and its serving network node, the connection takes the form of a DPVC segment which can be activated or deactivated by either the end system or the network node serving that end system. Necessary primitives and the responses of a system to those primitives are described later.

Referring to FIG. 2, a data processing system 24 capable of implementing a DPVC will have at least certain major functional components. Those components include a central processor 26, an operating system 28 and both RAM 30 and system memory 32. The system 24 also includes state registers 34 for storing the current operating state of the network. All of these components will be found in any conventional data processing system. To implement a preferred form of DPVC, the system also includes a supervisory timer 36 to control certain operations during establishment and clearing of DPVCs. Timer 36 can be characterized as a countdown timer which counts down to zero or times out after a predetermined period of time, assuming the counter isn't stopped or reset within that predetermined period.

The messages employed in establishing and clearing a DPVC and a brief description of the functions performed by each of those messages is included below in Table 1.

TABLE 1

| Message | Description |
| --- | --- |
| activate | Used to initiate VC establishment |
| activate response | Used to confirm VC establishment |
| deactivate | Used to clear a VC |
| deactivate response | Used to confirm VC clearing |

The message structure used for the messages identified in Table 1 can be any appropriate standard message structure for the network. In a preferred embodiment, the message structure shown in FIG. 3 and defined in detail in Q.933 may be employed. In the illustrated message structure the "Message Type" field would contain data representing one of the messages identified in Table 1 while the DLCI Information Element field would identify the particular virtual connection to be acted upon.

The primitives used for establishing and clearing dynamic permanent virtual connections can be any appropriate primitives for the network or user. Table 2 below identifies the preferred embodiment of these primitives and briefly describes their functions.

TABLE 2

| Primitive name | Brief Description |
| --- | --- |
| vc_activate_ind | Indication that a VC is to be activated |
| vc_activate_resp | Response to VC activation indication |
| vc_activate_req | Request for VC activation |
| vc_activate_conf | Confirmation that a VC has been activated |
| vc_deactivate_ind | Indication that virtual connection is to be cleared |
| vc_deactivate_resp | Response to VC clearing indication |
| vc_deactivate_req | Request for clearing of VC |
| vc_deactivate_conf | Confirmation that a VC has been cleared |

The messages and primitives exist to change the network from one defined state to another. The network states relevant to the present invention are listed and briefly defined below in Table 3.

TABLE 3

| State | Brief Description |
| --- | --- |
| VC inactive | No virtual connection exists between two identified end systems |
| VC active | An virtual connection exists between two identified end systems. |
| activate pending | A process for establishing a virtual connection has been initiated by an originating system. |
| activate received | An activate message has been received at a destination system requesting virtual connection. |
| deactivate pending | A process for clearing a virtual connection has been initiated by an end system or the network node serving that end system. |
| deactivate received | A deactivate message has been received at a destination system. |

FIG. 4 is a flow chart of operations that are performed in establishing a DPVC at the originating UNI in a frame relay network. The assumed user state at the start of the process is VC inactive. The originating end system transfers (in operation 38) an activate message to the network on a signaling channel defined as having a DLCI value=0, starts the supervisory countdown timer (operation 40), bringing the system into an activate pending state. The originating system then begins monitoring the network (operation 42) to determine if an activate response has been received.

The assumed network state at the start of the process is VC inactive. In the operation 39 network monitors to determine if an activate message has been received from the user. If an activate is received, then in an operation 44, the network node serving the originating end system initiates setup of an SPVC call through the network to the network node serving the destination end system. Once the SPVC call setup is initiated, the originating network node monitors the network (operation 46) for an indication that the SPVC call was accepted. If the SPVC call was accepted, the originating network node sends (operation 48) an activate response message to the UNI to the originating end system. These actions lead to the network assuming a VC active state. If operation 46 shows that the SPVC call was rejected, then a deactivate process (operation 49) is initiated.

If in operation 42 the originating end system receives an activate response message from the network before expiration of the first or second timer periods (to be discussed below), the end system enters the VC active state. Once the VC active state is entered, data can be exchanged between end systems over the established dynamic permanent virtual connection.

If operation 42 had not indicated receipt of an activate response from the network, then the end system would check (operation 50) the state of the supervisory timer to determine whether the timer had timed out at least once. For purposes of the present invention, the method can be thought of as including a closed loop consisting of operations 42 and 50 which are repeatedly exercised until it is determined that the supervisory timer has timed out. Once operation 50 indicates the timer has timed out at least once, the loop is broken and an operation 52 checks to see whether the timer was actually counting through a second timing period. Assuming a negative result, meaning the timer has timed out only once, the activate message is repeated (operation 54) and the timer is reset to start counting through the second timer period (operation 56). The end system then resumes monitoring for an active response in operation 42.

Operation 52 yields a positive response only if the timer has counted through two complete timing periods and no activate response has been received in reply to either the original activate message or the repeated activate message sent at the end of the first time out period. Under these conditions, the originating end system abandons the attempt to establish a virtual connection and initiates a process 58 for clearing the pending virtual connection.

FIG. 5 shows steps that are performed at the UNI serving the destination end system during the process of attempting to establish a dynamic permanent virtual connection. When the network node receives indication of an SPVC setup (operation 59) the network node transfers (operation 60) an activate message to the destination end system. When this transfer is completed, a supervisory timer is started (operation 62) and the node enters an activate pending state. The node program includes a loop consisting of operation 64 (a test for the presence of an activate response message from the destination end system) and operation 68 (a test to determine whether the supervisory timer has timed out).

The end system monitors the network for receipt of an activate message in operation 61. If an activate message is received an activate response is sent to the network (operation 63). The end system enters VC activate state.

There are two exits from the loop the network side uses to wait for the activate response in operations 64 and 68. The first exit is taken when operation 64 detects an activate response message from the destination end system. At this exit, an operation 66 is performed to stop the supervisory timer and to cause the node to enter a VC active state. As part of the same operation, the network node initiates a response to the SPVC call from the originating network node.

The second exit is taken when operation 68 determines that the supervisory timer has timed out. A further test 70 is then performed to determine whether the timer was actually counting through a second timing period. A negative response indicates the timer timed out after a first time period. The timer is then reset, and an activate message is resent in operation 72 and the program returns to the input of the loop consisting of operations 64 and 68.

If operation 70 shows that the timer had timed out after a second time period, the destination network node effectively gives up waiting for a possible activate response message and initiates a process (operation 74) for clearing the pending SPVC call.

Figure 6:
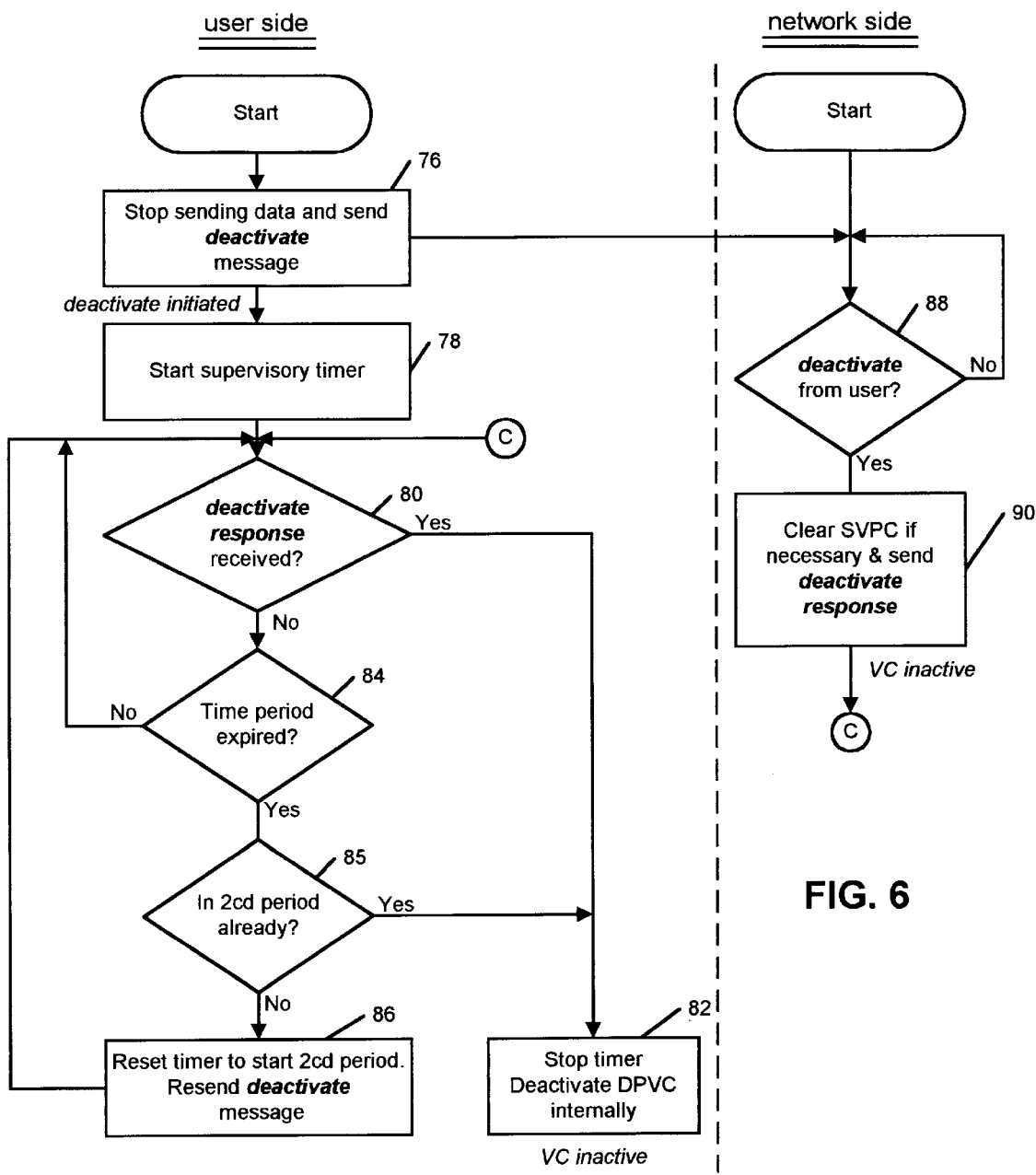
FIG. 6 is a flow diagram of steps that are performed when the user initiates deactivation of a dynamic permanent virtual connection.

The flow charts described above show steps taken to establish a DPVC connection at a UNI. FIG. 6 is a flow chart of steps performed when the user initiates deactivation of the DPVC. In an operation 76, the end system initiating the deactivation process stops sending data and sends a deactivate message toward the destination end user. The supervisory timer is started in an operation 78. The end system enters a deactivate initiated state and waits (operation 80) for receipt of a deactivate response message from the network.

The network waits for receipt of a deactivate message from the user in operation 88. If a deactivate message is received, the corresponding SPVC is cleared, if necessary, the network sends a deactivate response to the user and enter the VC inactive state. (operation 90)

Operation 80 is the front end of a loop including operation 84 for testing the supervisory timer for a time out condition. As long as no deactivate response message is detected and the timer has not timed out, the program continues to operate in this loop. When a time out is detected, a test is made in operation 85 to see if it is the second period. If not, the timer is reset and the deactivate message is repeated in an operation 86. If it is the second period, the end system responds (in operation 82) deactivating the DPVC internally. This causes the system to return to the VC inactive steady state.

When a deactivate response is received, the end system responds (in operation 82) by stopping the supervisory timer, deactivating the DPVC at the UNI. This causes the system to return to the VC inactive steady state.

Figure 7:
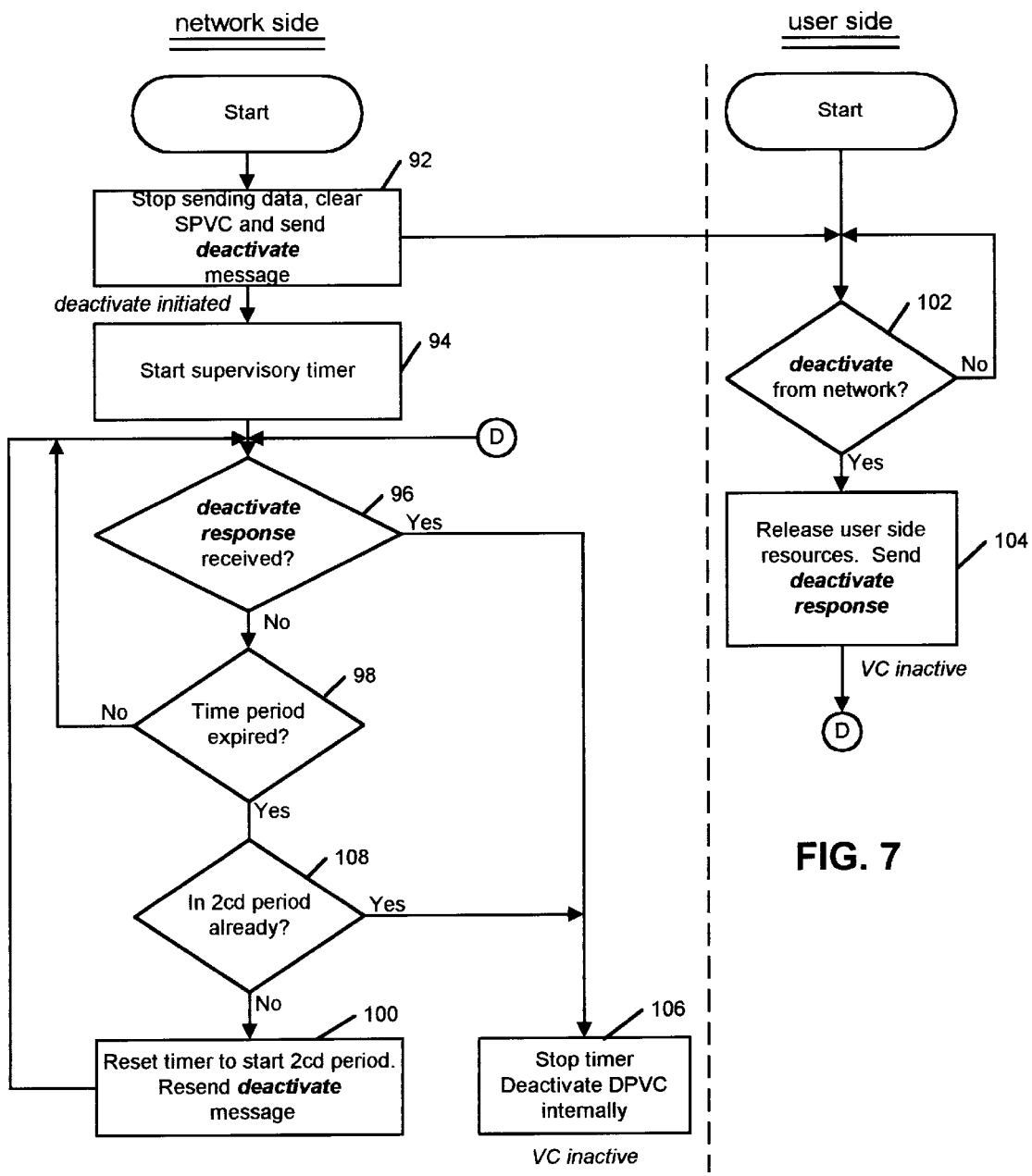
FIG. 7 is a flow diagram of steps that are performed when the network initiates deactivation of a dynamic permanent virtual connection.

FIG. 7 is a flow chart of steps performed when the network initiates deactivation of the DPVC when an SPVC clearing indication is received. In an operation 92, the network initiating the deactivation process stops sending data, clears the SPVC and sends a deactivate message toward the destination end system. The supervisory timer is started in an operation 94. The network enters a deactivate initiated state and monitors (operation 96) for receipt of a deactivate response message from the end system.

The end system waits for receipt of a deactivate message from the network in operation 102. If a deactivate message is received, the end system sends a deactivate response to the network and enters the VC inactive state. (operation 104)

Operation 96 is the front end of a loop including operation 98 for testing the supervisory timer for a time out condition. As long as no deactivate response message is detected and the timer has not timed out, the program continues to operate in this loop. When a time out is detected, a test is made in operation 108 to see if it is the second period. If not, the timer is reset and the deactivate message is repeated in an operation 100. If it is the second period, the network responds (in operation 106) deactivating the DPVC internally. This causes the system to return to the VC inactive steady state.

When a deactivate response is received, the end system responds (in operation 106) by stopping the supervisory timer, deactivating the DPVC at the UNI. This causes the system to return to the VC inactive steady state.

Figure 8:
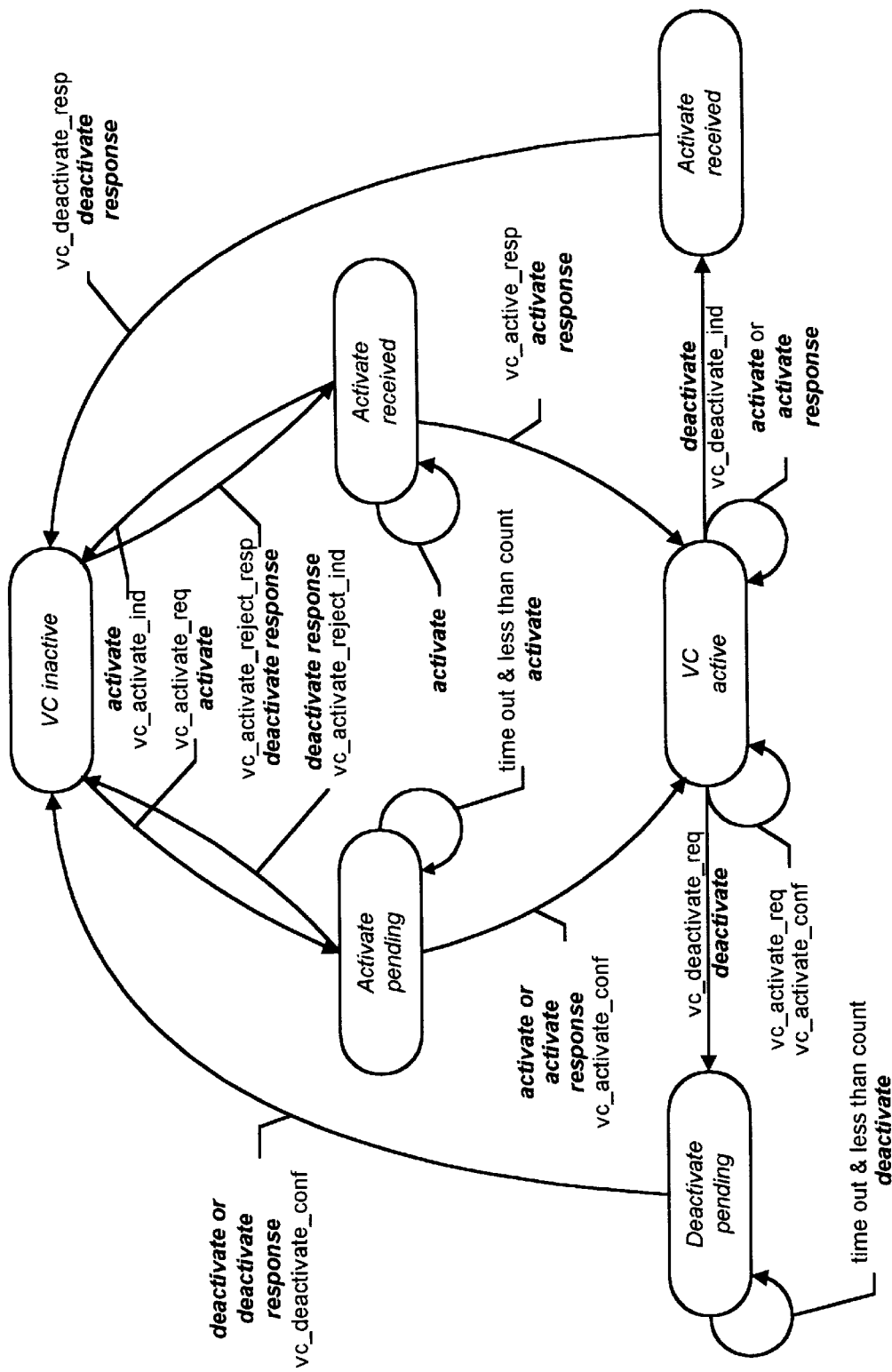
FIG. 8 is a state diagram showing system states, primitives and responses to those primitives in a system implementing dynamic permanent virtual connections.

The flow charts have described some of the messages, primitives and system states that are relevant for activation and deactivation operations. FIG. 8 is a complete state diagram showing the possible system states and the various messages and primitives that are involved in transitioning the system from a given one of the system states to another of the system states.

While there has been described what is considered to be a preferred embodiment of the invention, variations and modifications will occur to those skilled in the art once they learn of the preferred embodiment. Therefore, it is intended that the appended claims shall be construed to include both the preferred embodiment and all variations and modifications thereof that fall within the true spirit and scope of the invention.

What is claimed is:

1. For use in data communication networks having at least two sub-networks connected to each other through links at network-to-network interfaces (NNIs) and at least two end users, each end user being connected to at least one of the network nodes at a user-to-network interface (UNI), a method of controlling a virtual connection (VC) between the two end users, said method comprising the steps of:

a) activating a dynamic permanent virtual connection (DPVC) segment at the UNI between an originating end user and an originating network node by
      transferring a connection-activating message from the originating end user to the originating network node, said connection-activating message including a data link connection identifier (DLCI) value for the DPVC segment for the UNI between the originating end user and the originating network node,
      where an activation-accepted response is received from the network within a predetermined period of time, completing the establishment of a switched permanent virtual connection (SPVC) from the originating network node to the destination network node, and
      where no activation-accepted response is received from the network within a predetermined period of time, abandoning the attempt to establish a virtual connection between the originating end user and the destination end user;
         said DPVC segment being terminable under the control of either the originating end user or the originating network node;
   b) activating a DPVC segment at the UNI between a destination network node and a destination end user, said DPVC segment being terminable under the control of either the destination end user or the destination network node; and
   c) establishing a switched permanent virtual connection (SPVC) between the originating and destination network nodes to form a complete virtual connection between the originating end user and the destination end user.

2. A method as set forth in claim 1 wherein the step of establishing the Dynamic Permanent Virtual Connection (DPVC) comprises the further steps of:
   transferring a connection-activating message to the originating network node, said connection-activating message including a data link connection identifier (DLCI) value for the originating DPVC segment;
   starting a timer which times out after a predetermined period of time;
   where an activation-accepted response is not received from the network before the timer times out once, repeating the connection-activating message and restarting the timer; and
   where an activation-accepted response is not received from the network before the timer times out a second time, terminating any further attempt to establish a virtual connection through the network.

3. A method as set forth in claim 1 wherein the step of establishing the Dynamic Permanent Virtual Connection (DPVC) comprises the following steps performed at the destination network node:
   on receipt of an SPVC establishment indication, transferring a connection-activating message to the destination end user, said connection-activating message including a data link connection identifier (DLCI) value for the destination DPVC segment;
   where an connection-activation-accepted response is received from the destination end user within a predetermined period of time, returning a message to the originating network node indicating the acceptance of the DPVC activation; and
   where a connection-activation-accepted response is not received from the destination end user within a predetermined period of time, ending any attempt to establish a virtual connection between the originating end user and the destination end user.

4. A method as set forth in claim 1 wherein the step of establishing the Dynamic Permanent Virtual Connection (DPVC) comprises the following steps performed at the destination network node:
   transferring a connection-activating message to the destination end user, activate message including a data link connection identifier (DLCI) value for the destination DPVC segment;
   starting a timer which times out after a predetermined period of time;
   where an connection-activation-accepted response is not received from the destination end user before the timer times out once, repeating the connection-activating message and restarting the timer; and
   where an activate-accepted response is not received from the end user before the timer times out a second time, terminating any further attempt to establish a virtual connection through the network.

5. A method as set forth in 1, 2, 3 or 4 including the additional step of deactivating a dynamic permanent virtual connection established between the originating end user and the destination end user by:
   stopping sending of data;
   sending a connection-deactivating message toward the other end user;
   initiating clearing of the SPVC between the originating and destination network nodes when the network receives a a connection-deactivating message,
   starting a timer which times out after a predetermined period of time;
   where no deactivation-acknowledgement is received before the end of the predetermined period of time, resending the deactivate message and resetting the timer; and
   where a deactivation-acknowledgement is received, stopping the timer and internally deactivating the DPVC segment.

\* \* \* \* \*